(12) United States Patent
Higa et al.

(10) Patent No.: US 11,115,704 B2
(45) Date of Patent: Sep. 7, 2021

(54) MEDIA CHANNEL NAVIGATION USER INTERFACE SYSTEMS AND METHODS

(71) Applicant: Verizon Patent and Licensing Inc., Arlington, VA (US)

(72) Inventors: George M. Higa, Plano, TX (US); Brian F. Roberts, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 554 days.

(21) Appl. No.: 14/675,558

(22) Filed: Mar. 31, 2015

(65) Prior Publication Data

US 2016/0127785 A1    May 5, 2016

Related U.S. Application Data

(60) Provisional application No. 62/072,863, filed on Oct. 30, 2014.

(51) Int. Cl.
| | |
|---|---|
| *H04N 21/431* | (2011.01) |
| *H04N 21/45* | (2011.01) |
| *H04N 21/466* | (2011.01) |
| *H04N 21/258* | (2011.01) |
| *H04N 21/442* | (2011.01) |
| *H04N 21/25* | (2011.01) |

(Continued)

(52) U.S. Cl.
CPC ....... *H04N 21/4312* (2013.01); *G06F 3/0482* (2013.01); *H04N 21/252* (2013.01); *H04N 21/25891* (2013.01); *H04N 21/4316* (2013.01); *H04N 21/44218* (2013.01); *H04N 21/44222* (2013.01); *H04N 21/4532* (2013.01); *H04N 21/4586* (2013.01); *H04N 21/4622* (2013.01); *H04N 21/4661* (2013.01); *H04N 21/4667* (2013.01); *H04N 21/472* (2013.01); *H04N 21/4725* (2013.01); *H04N 21/4755* (2013.01); *H04N 21/4788* (2013.01); *H04N 21/47202* (2013.01); *H04N 21/47205* (2013.01); *H04N 21/4821* (2013.01); *H04N 21/4825* (2013.01); *H04N 21/4826* (2013.01); *H04N 21/6582* (2013.01); *H04N 21/8133* (2013.01)

(58) Field of Classification Search
None
See application file for complete search history.

(56) References Cited

U.S. PATENT DOCUMENTS 6,865,746 B1 *  3/2005  Herrington ........ H04N 5/44543
                                                 348/E5.105
6,973,663 B1 * 12/2005  Brown ................ G06F 3/0482
                                                 348/E7.06

(Continued)

*Primary Examiner* — Nathan J Flynn
*Assistant Examiner* — Christine A Kurien

(57) ABSTRACT

An exemplary method includes a media channel navigation user interface system detecting, while media content distributed on a media channel is being presented for display on a display screen, a user request to launch a media channel navigation user interface, and providing, in response to the detected user request and for concurrent display with the presentation of the media content on the display screen, a media channel navigation user interface pane comprising a set of media channel navigation tools that include at least media content channel navigation tools selectable by a user to launch different types of menus of media channels in the media channel navigation user interface pane.

20 Claims, 11 Drawing Sheets

(51) Int. Cl.
*H04N 21/658* (2011.01)
*H04N 21/462* (2011.01)
*H04N 21/4725* (2011.01)
*H04N 21/475* (2011.01)
*H04N 21/482* (2011.01)
*H04N 21/81* (2011.01)
*G06F 3/0482* (2013.01)
*H04N 21/472* (2011.01)
*H04N 21/4788* (2011.01)
*H04N 21/458* (2011.01)

(56) References Cited

U.S. PATENT DOCUMENTS

| | | | | |
|---|---|---|---|---|
| 7,890,849 | B2* | 2/2011 | Moraveji | G06F 17/30064 |
| | | | | 715/203 |
| 8,745,664 | B2* | 6/2014 | Schwesinger | H04N 5/44543 |
| | | | | 348/552 |
| 2003/0204846 | A1* | 10/2003 | Breen | H04N 5/44543 |
| | | | | 725/39 |
| 2010/0122293 | A1* | 5/2010 | Craner | H04N 5/44582 |
| | | | | 725/40 |
| 2010/0306798 | A1* | 12/2010 | Ahn | H04N 5/445 |
| | | | | 725/38 |
| 2011/0289530 | A1* | 11/2011 | Dureau | H04N 21/4622 |
| | | | | 725/38 |
| 2013/0276042 | A1* | 10/2013 | Savastianov | H04L 12/1881 |
| | | | | 725/95 |

* cited by examiner

MEDIA CHANNEL NAVIGATION USER INTERFACE SYSTEMS AND METHODS

RELATED APPLICATIONS

The present application claims priority under 35 U.S.C. § 119(e) to U.S. Provisional Patent Application No. 62/072,863, filed Oct. 30, 2014. The contents of the provisional patent application are hereby incorporated by reference in their entirety.

BACKGROUND INFORMATION

A media distribution service may distribute media content on media programming channels ("media channels") for access by end users of the service. For example, certain subscriber television services distribute television programs on television programming channels for access by subscribers.

An end user of such a channel-based media distribution service typically accesses the distributed media content by tuning a media content access device, such as a set-top box device, to the media channels on which the media content is distributed. Conventionally, the end user provides channel selection input by way of a remote control device, such as by using a numeric keypad to enter media channel numbers and/or by pressing other buttons (e.g., channel-up, channel-down, and/or previous-channel buttons) included on the remote control device, to direct the media content access device to tune from one media channel to another media channel. Such navigation of media channels is commonly referred to as "channel surfing."

Unfortunately, conventional media channel navigation technologies provide limited channel surfing capabilities, which limitations may cause inconvenience and/or inefficiency in certain scenarios. For example, while channel surfing, a user may find that using conventional media programming navigation technologies to navigate hundreds, and potentially thousands, of media channels to discover and/or access a particular media channel or media program that interests the user is less convenient and/or less efficient than desired.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary media channel navigation user interface systems and methods are described herein. The systems and methods may provide a media channel navigation user interface pane for concurrent display with a presentation of media content on a display screen. The media channel navigation user interface pane may include a set of media channel navigation tools selectable by a user to launch different types of menus of media channels in the media channel navigation user interface pane. The various tools and menus in the media channel navigation user interface pane may be utilized by the user, while the presentation of the media content continues, to intuitively, conveniently, and/or efficiently discover and access a media channel and/or a media program that is of interest to the user. The various tools and menus may facilitate new and/or improved ways of channel surfing by the user. Additional or alternative benefits that may be provided by one or more of the exemplary systems and methods described herein will be made apparent herein. Exemplary systems and methods will now be described in reference to the drawings.

Figure 1:
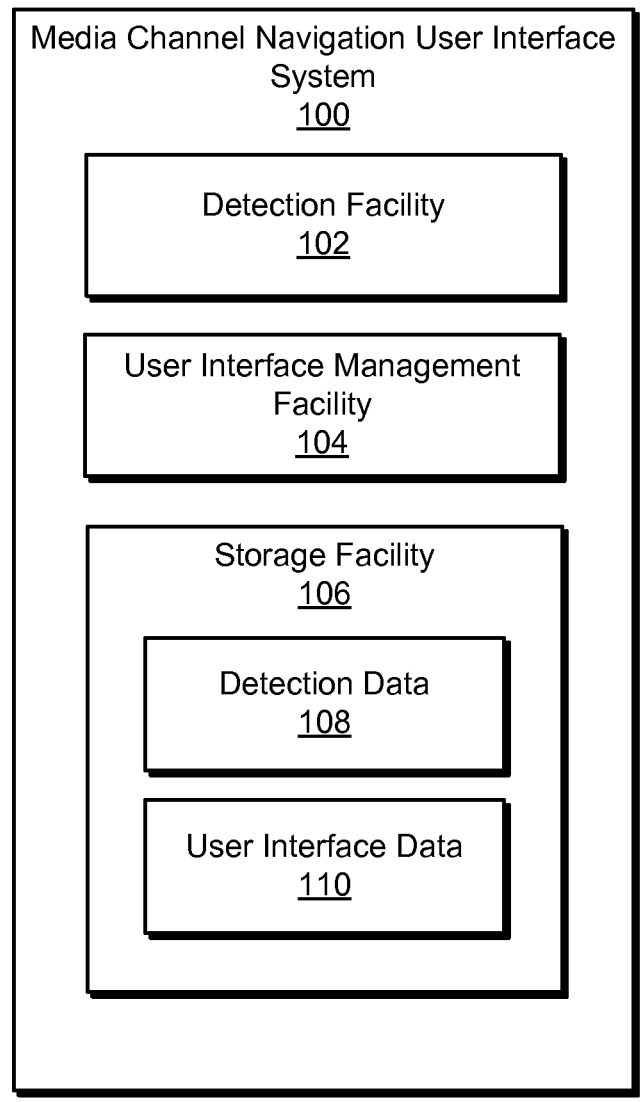
FIG. 1 illustrates an exemplary media channel navigation user interface system according to principles described herein.

FIG. 1 illustrates an exemplary media channel navigation user interface system 100 ("system 100") configured to provide a media channel navigation user interface for use by a user of a media content access system to discover and access media channels and media programs distributed on the media channels. As shown, system 100 may include, without limitation, a detection facility 102, a user interface management facility 104 ("management facility 104"), and a storage facility 106 selectively and communicatively coupled to one another. Any suitable communication technologies, including any of the communication technologies mentioned herein, may be employed to facilitate communications between facilities 102-106.

Although facilities 102-106 are shown to be discrete facilities in FIG. 1, facilities 102-106 may be combined into fewer facilities, such as into a single facility, or divided into more facilities as may serve a particular implementation. Additionally or alternatively, one or more of the facilities 102-106 may be separate from and external to system 100 in other implementations. For example, storage facility 106 may be external of and communicatively coupled to system 100 in certain alternative implementations.

Facilities 102-106 of system 100 may include or be otherwise implemented by one or more physical computing devices specifically configured to perform one or more of the operations described herein. In such implementations, system 100 may be referred to as a computer-implemented system 100.

Storage facility 106 may store detection data 108 and user interface data 110. Detection data 108 may include data generated and/or used by detection facility 102. User interface data 110 may include data used and/or generated by management facility 104, such as data representative of a user interface and/or user interface content. Storage facility 106 may maintain additional or alternative data as may serve a particular implementation.

Detection facility 102 may detect user input provided by a user to system 100 and/or to a media content access system configured to access media content distributed by way of media channels. The user input may be any suitable type of input and may be received and detected in any suitable way. For example, the user input may include a user selection of a button on a remote control device associated with the media content access system, a user selection of a selectable option in a user interface associated with the media content access system, a voice command, and/or any other suitable form of user input that may be provided to the media content access system. Detection facility 102 may detect any of the exemplary user input described herein.

Management facility 104 may provide a user interface through which a user may interact with a media content access system. The user interface may include a media channel navigation user interface configured to facilitate discovery and access of media channels. In certain examples, the media channel navigation user interface may include a media channel navigation user interface pane displayed concurrently with a presentation of media content (e.g., a foreground or background presentation of media content) in a graphical user interface screen view. The media channel navigation user interface pane, examples of which are described herein, may include one or more media channel navigation tools and/or features (e.g., menus) for use by a user of the media content access system to discover and access media channels while the media content continues to be presented.

Figure 2:
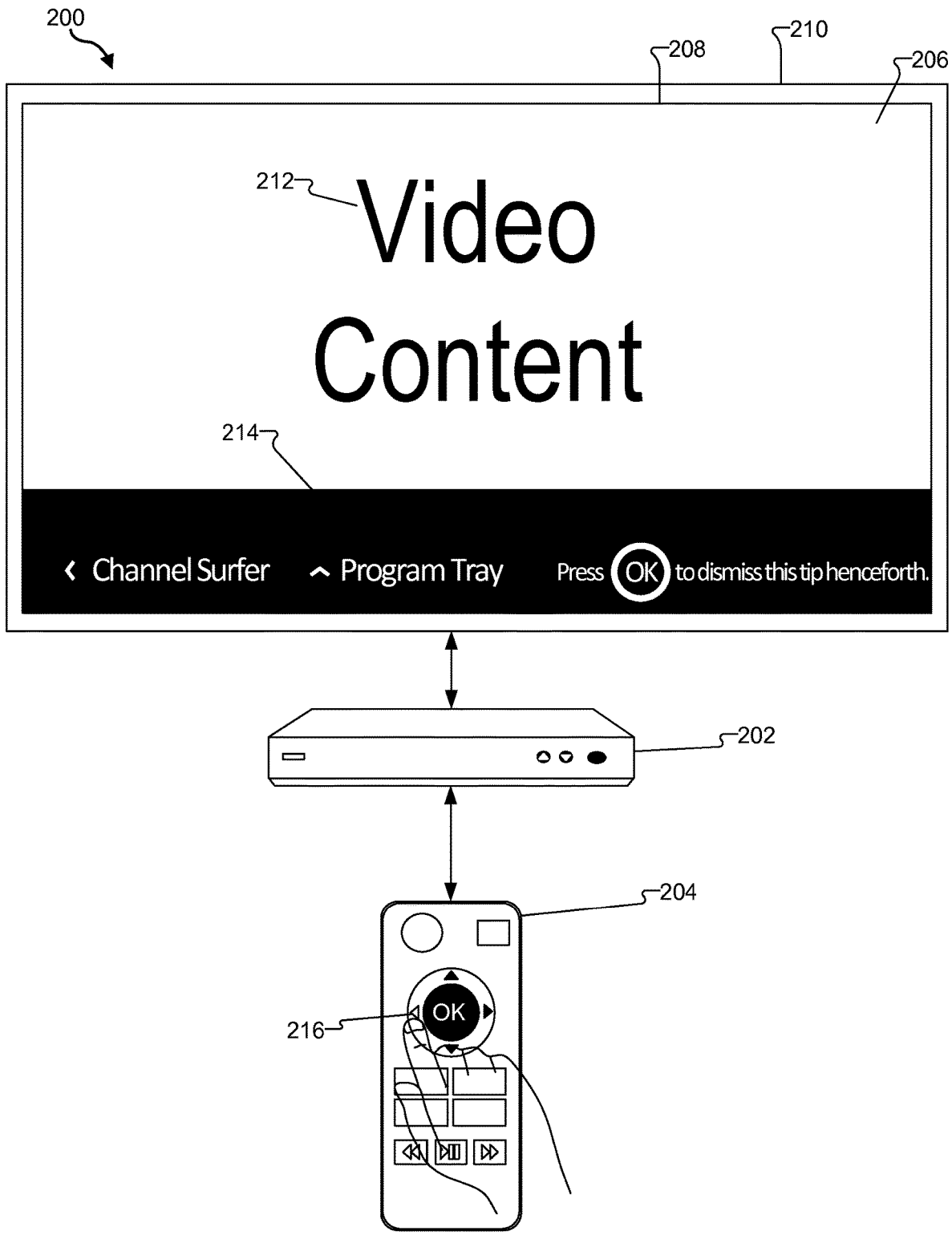
FIG. 2 illustrates an exemplary implementation of the system of FIG. 1 according to principles described herein.

FIG. 2 illustrates an exemplary implementation 200 of system 100. Implementation 200 may include a media content access system 202 that implements one or more components of system 100. Media content access system 202 may include one or more physical computing devices specifically configured to access media channels and media programs distributed on the media channels. For example, media content access system 202 may include a set-top box device, a digital video recording ("DVR") device, a television, a personal computer, or any other computing device specifically configured to access media channels and media programs distributed on the media channels. Media content access system 202 may be further configured, by one or more components of system 100 implemented thereon, to generate and provide a user interface through which a user of media content access system 202 may interact with media content access system 202.

In certain examples, media content access system 202 may be controlled by a user utilizing a remote control device 204 to provide commands to media content access system 202. Remote control device 204 may include any device suitable to receive user input and transmit command signals to media content access system 202. Remote control device 204 and media content access system 202 may communicate using any suitable communication technologies, including infrared, radio frequency ("RF"), Wi-Fi, local networking, or other wireless remote communication technologies.

Media content access system 202 may provide a graphical user interface ("GUI") 206 for display on a display screen 208 of a display device 210 communicatively coupled to media content access system 202. Display device 210, which may be communicatively coupled to media content access system 202 in any suitable way, may include a television, a computer monitor, an integrated display device, or any other display device having a display screen on which a graphical user interface provided by media content access system 202 may be displayed.

Media content access system 202 may access (e.g., tune to) a media channel and provide media content distributed on the media channel for presentation to a user of media content access system 202. The media content may be presented for display on display screen 208. In FIG. 2, for example, video content 212 included in the media content (e.g., a video component of the media content) may be presented (e.g., played back) in a main video playback screen view of GUI 206.

In certain examples, while the media content is being presented for display on display screen 208, media content access system 202 may provide an information bar 214 for concurrent display with the presentation of the media content. For example, information bar 214 may be overlaid on a portion of a full-screen video presentation screen. Information bar 214 may visually indicate one or more features available to a user of media content access system 202 and user input that may be provided by the user to launch those features. In the illustrated example, information bar 214 indicates that the user may press an "OK" button to hide the information bar 214 off-screen, an "up" arrow of a directional pad to launch a program tray feature on-screen, and a "left" arrow of the directional pad to launch a channel surfer feature on-screen.

While the media content is being presented for display in a main video playback screen view (e.g., in a full-screen video playback screen view) on display screen 208, a user of media content access system 202 may actuate a button of remote control device 204, such as a left arrow button 216 of the directional pad on remote control device 204 as illustrated in FIG. 2. Detection facility 102 may detect this user input as a user request to launch the channel surfer feature on-screen, or, in other words, as a user request to launch a media channel navigation user interface associated with the channel surfer feature.

Management facility 104 may provide, in response to the detected request, a media channel navigation user interface pane for concurrent display with the presentation of the media content on display screen 208. For example, the media channel navigation user interface pane may be overlaid on a portion of a full-screen video presentation screen on which a video component of the media content is presented. The media channel navigation user interface pane may include a set of media channel navigation tools that are selectable by the user to launch corresponding channel navigation features such as corresponding menus of media channels in the media channel navigation user interface pane. Certain media channel navigation tools may be selectable to launch different types of menus of media channels in the media channel navigation user interface pane. Examples of media channel navigation tools and corresponding menus of media channels that may be included in the media channel navigation user interface pane are illustrated in FIGS. 3-7 and will now be described.

Figure 3:
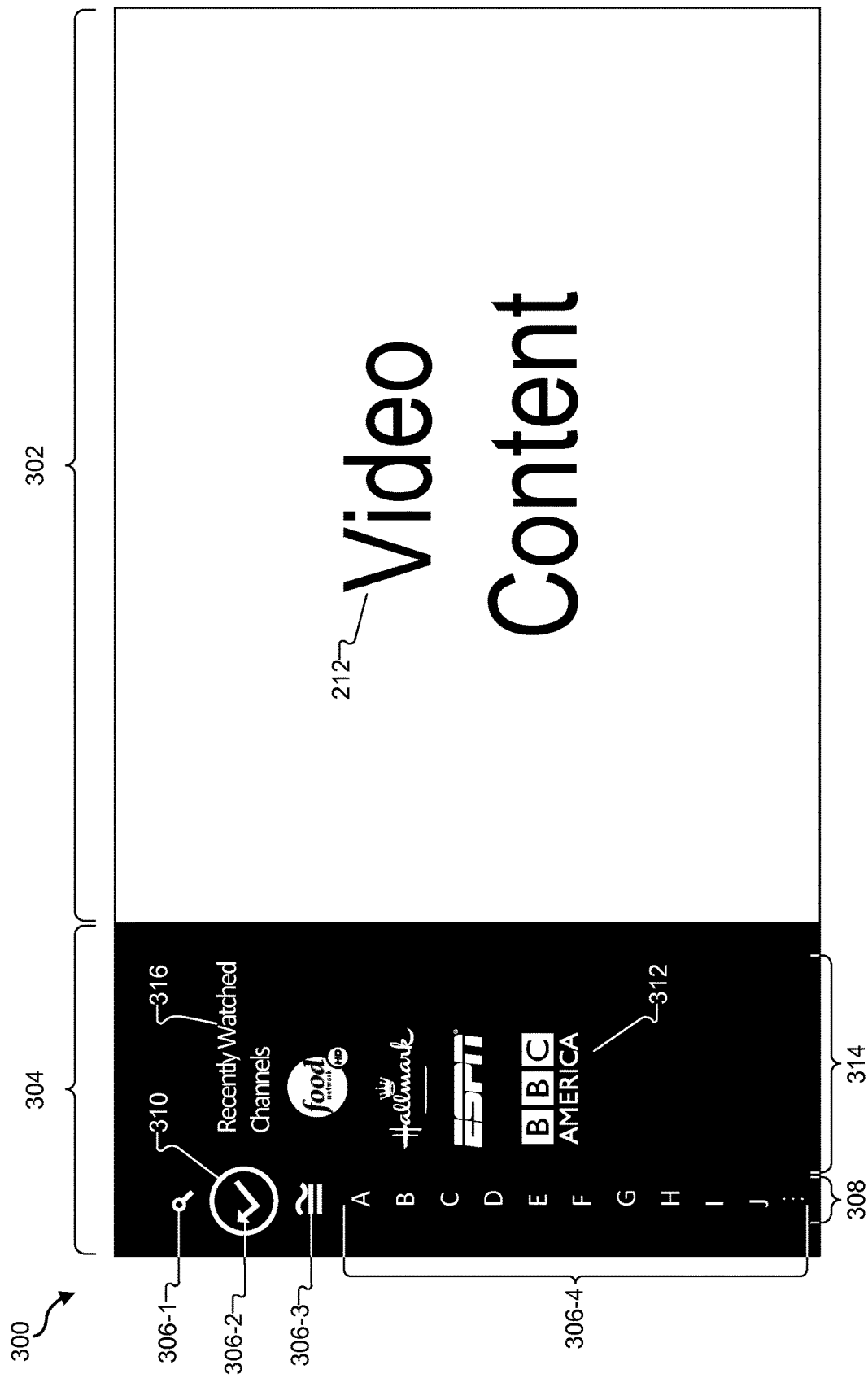
FIGS. 3-7 illustrate exemplary graphical user interface screen views according to principles described herein.

FIG. 3 illustrates an exemplary GUI screen view 300 that may be provided by management facility 104 for display on display screen 208. In certain examples, GUI screen view 300 may be provided for display in response to a detection of a user request to launch a media channel navigation user interface.

GUI screen view 300 may include a main video playback pane 302 in which media content is presented. For example, video content 212 included in the media content may be presented in main video playback pane 302. Main video playback pane 302 may provide a substantially full-screen video presentation screen in certain embodiments.

GUI screen view 300 may also include a media channel navigation user interface pane 304 provided by management facility 104 for concurrent display with the presentation of the media content. Media channel navigation user interface pane 304 may be presented together with the presentation of the media content in any suitable way, such as by displaying media channel navigation user interface pane 304 along a peripheral edge of display screen 208 either adjacent to or overlaid on a portion of main video playback pane 302. In FIG. 3, for example, media channel navigation user interface pane 304 is displayed along a left peripheral edge of GUI screen view 300. Other configurations of media channel navigation user interface pane 304 may be used in other examples. In certain other examples, an edge of media channel navigation user interface pane 304 may be visually softened to blend with main video playback pane 302.

Media channel navigation user interface pane 304 may include a set of media channel navigation tools. In FIG. 3, for example, media channel navigation user interface pane 304 includes a set of media channel navigation tools 306 (e.g., media channel navigation tools 306-1 through 306-4) arranged in a first vertical column 308 of media channel navigation user interface pane 304. Media channel navigation tools 306 may be configured to function as a primary menu list in media channel navigation user interface pane 304. Media channel navigation tools 306 may be selectable by a user to launch media channel navigation user interface features such as menus of media channels. In certain examples, certain media channel navigation tools 306 may be selectable by a user to launch different types of menus of media channels. Such a menu may be configured to function as a secondary menu list in media channel navigation user interface pane 304, the menu being a sub-menu corresponding to a media channel navigation tool in the primary menu list.

Media channel navigation tool 306-1 may provide a link to a search feature. For example, in response to a user selection of media channel navigation tool 306-1, management facility 104 may link to and initiate a launch of another GUI view screen that includes a search feature that may be used by the user to search for available media channels and/or media programs.

Media channel navigation tool 306-2 may include a recent-channel navigation tool selectable by a user to launch, in media channel navigation user interface pane 304, a recency-based menu of one or more media channels accessed by media content access system 202 prior to the launch of the recency-based menu. The recency-based menu may be a first type of menu of media channels that includes one or more media channels selected by management facility 104 for inclusion in the menu based on recency of access of the one or more media channels by media content access system 202 prior to the launch of the recency-based menu.

Media channel navigation tool 306-3 may include a similar-channel navigation tool selectable by a user to launch, in media channel navigation user interface pane 304, a similarity-based menu of one or more media channels that share one or more attributes with the media channel currently being accessed by media content access system 202. The similarity-based menu may be a second type of menu of media channels that includes one or more media channels that are selected by management facility 104 for inclusion in the menu based on similarities (e.g., shared attributes such as may be indicated by shared metadata values) of the one or more media channels with the media channel currently being accessed by media content access system 202.

Media channel navigation tool 306-4 may include an alphabet-based-channel navigation tool selectable by a user to launch, in media channel navigation user interface pane 304, an alphabet-based menu of one or more media channels having alphabetically similar names. In the illustrated example, the alphabet-based-channel navigation tool includes a plurality of alphabet character options each selectable by a user to launch, in media channel navigation user interface pane 304, a corresponding alphabet-based menu of one or more media channels having alphabetically similar names (e.g., a menu of media channels having names that start with the character "A," a menu of media channels having names that start with the character "B," etc.). The alphabet-based menu may be a third type of menu of media channels that includes one or more media channels that are selected for inclusion in the menu based on alphabetical attributes (e.g., alphabetical similarities) of the names of the media channels.

While FIG. 3 illustrates an exemplary set of media channel navigation tools 306 that may be displayed in media channel navigation user interface pane 304, the exemplary set is illustrative only. Other sets of media channel navigation tools 306 may be displayed in media channel navigation user interface pane 304 in other examples. For example, one or more of media channel navigation tools 306 (e.g., media channel navigation tool 306-1) may be omitted from the set of media channel navigation tools 306 in other examples. Additionally or alternatively, a presentation order of the media channel navigation tools 306 may be rearranged in other examples.

One of the media channel navigation tools 306 may be selected, and the selection may trigger a launch of a corresponding channel navigation feature, such as a menu of media channels, in media channel navigation user interface pane 304. A media channel navigation tool 306 may be selected in any suitable way. As an example, a media channel navigation tool 306 may be selected by management facility 104 by default, in accordance with default settings, upon launch of media channel navigation user interface pane 304. As another example, a media channel navigation tool 306 may be selected by management facility 104 in response to user input provided by a user. Any suitable user input may be provided by the user to select a media channel navigation tool 306.

To illustrate, a selector object 310 may be positioned within media channel navigation user interface pane 304 to select a media channel navigation tool 306. In FIG. 3, for example, selector object 310 is positioned to select media channel navigation tool 306-2. The positioning of selector object 310 to select media channel navigation tool 306-2 may be a result of media channel navigation tool 306-2 having been predefined to be a default selection or a result of a user providing input to move selector object 310 to media channel navigation tool 306-2.

Detection facility 102 may detect a selection of a media channel navigation tool 306 in media channel navigation user interface pane 304. In response to the detected selection, management facility 104 may launch, in media channel navigation user interface pane 304, a channel navigation feature that corresponds to the selected media channel navigation tool 306. For example, detection facility 102 may detect a selection of media channel navigation tool 306-2 in media channel navigation user interface pane 304, and, in response, management facility 104 may provide a menu of media channels that corresponds to media channel navigation tool 306-2 for concurrent display with the set of media channel navigation tools 306 in media channel navigation user interface pane 304.

FIG. 3 illustrates an example of a recency-based menu 312 of media channels that has been launched by management facility 104 for display in media channel navigation user interface pane 304 in response to a selection of media channel navigation tool 306-2. As shown, recency-based menu 312 may include a set of media channels arranged in a second vertical column 314 in media channel navigation user interface pane 304. In the illustrated example, the set of media channels includes a "FOOD NETWORK" media channel, a "HALLMARK" media channel, an "ESPN" media channel, and a "BBC AMERICA" media channel.

Management facility 104 may also provide, in media channel navigation user interface pane 304, a visual indication of a menu type associated with recency-based menu 312. In FIG. 3, for example, media channel navigation user interface pane 304 includes a textual description 316 that is positioned as a header to recency-based menu 312 and that indicates that the recency-based menu 312 is a type of menu that includes media channels recently accessed by media content access system 202.

As part of providing recency-based menu 312 for display in media channel navigation user interface pane 304, management facility 104 may select a set of media channels for inclusion in recency-based menu 312 based on a set of predefined recency-based channel selection factors. The set of factors may specify any suitable conditions to be satisfied in order for a media channel to be selected for inclusion in or excluded from recency-based menu 312. Examples of recency-based channel selection factors include, without limitation, an indication of a maximum number of media channels that may be included in recency-based menu 312, an instruction to exclude the media channel currently being accessed by media content access system 202 from recency-based menu 312, an instruction to exclude a particular pre-selected media channel or type of media channel from recency-based menu 312 (e.g., an instruction to exclude an adult-oriented media channel or a pay-per-view media channel), an instruction to consider only media channels that have been accessed within a particular time period (e.g., within the same day, same user session, since last power-up of media content access system 202, etc.) for inclusion in recency-based menu 312, an instruction to consider only media channels that have been accessed a particular way or for a particular purpose (e.g., for live presentation of media content, not in association with a scheduled recording, etc.) for inclusion in recency-based menu 312, an instruction indicating how to prioritize media channels for selection and/or presentation in recency-based menu 312 (e.g., an instruction to order selected media channels from a most-recently accessed channel to a least-recently accessed channel), an instruction to consider only media channels that have been accessed by media content access system 202 for at least a minimum threshold of time (e.g., five seconds, one minute, etc.) for inclusion in recency-based menu 312, and any other factor that may be used by management facility 104 to select a set of media channels for inclusion in recency-based menu 312.

Based on the set of predefined recency-based channel selection factors, management facility 104 may select a set of media channels for inclusion in recency-based menu 312. As an example, management facility 104 may access a history of accessed media channels (e.g., an access log maintained by media content access system 202) and apply the set of predefined recency-based channel selection factors to the access history to select, from the access history, a set of media channels for inclusion in recency-based menu 312.

To illustrate, the access history may indicate the last ten media channels accessed by media content access system 202. Management facility 104 may apply the predefined recency-based channel selection factors to select a number of the media channels for inclusion in recency-based menu 312. The selected channels may be the last media channels, other than the media channel currently being accessed, accessed by media content access system 202 prior to the launch of recency-based menu 312. Accordingly, management facility 104 may select the media channels for inclusion in recency-based menu 312 and populate recency-based menu 312 with the media channels. Management facility 104 may provide the populated recency-based menu 312 for display in media channel navigation user interface pane 304, such as is illustrated in FIG. 3.

Media channels included in a menu of media channels displayed in media channel navigation user interface pane 304 may be selectable by a user. The user may provide any suitable user input to select a media channel from a menu of media channels. For example, the user may provide input (e.g., actuation of a "right" arrow of a directional pad) to move selector object 310 from the first vertical column 308 to the second vertical column 314 in media channel navigation user interface pane 304, which in effect may move an active focus from a primary menu list in the first vertical column 308 to a secondary menu list in the second vertical column 314. In response, selector object 310 may be positioned to select a media channel included in the menu of media channels.

Figure 4:
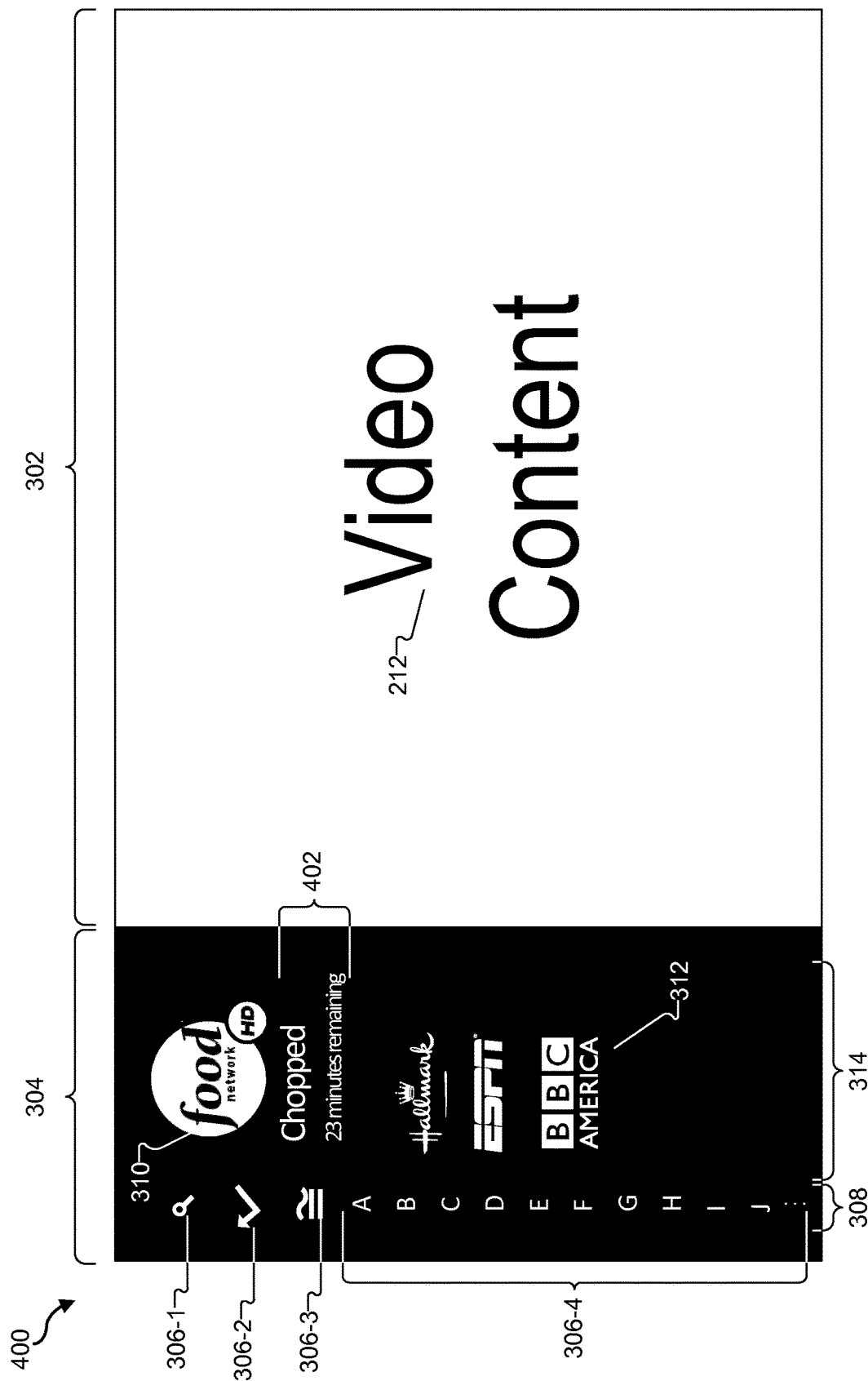

FIG. 4 illustrates an exemplary GUI screen view 400 in which selector object 310 has been moved to select a media channel included in recency-based menu 312. The positioning of selector object 310 is on the "FOOD NETWORK" media channel, as visually represented by relative enlargement of a graphical object representing the media channel compared to other graphical objects representing other media channels included in recency-based menu 312.

A selection of a media channel by placement of selector object 310 on the graphical object representing the media channel may be referred to as a "highlight-type" selection. Detection facility 102 may detect such a selection of the media channel. In response to the detected selection of the media channel, management facility 104 may perform one or more operations. For example, management facility 104 may provide content related to the media channel for concurrent display with the menu of media channels in media channel navigation user interface pane 304. In FIG. 4, for example, content 402 related to the selected media channel is displayed adjacent to the graphical object representing the media channel in recency-based menu 312. As shown, content 402 may indicate a name of a media program currently being distributed on the media channel and the time remaining in the distribution of the media program. Content 402 may include any other information about and/or other displayable content that is related to the media channel, such as the current score and/or statistics for a sporting event program being distributed on the media channel.

In other examples, management facility 104 may provide content (e.g., content 402) related to the media channel for concurrent display with the menu of media channels in media channel navigation user interface pane 304 independently of user input. For instance, content 402 may be displayed in media channel navigation user interface pane 304 without requiring a user selection of the "FOOD NETWORK" media channel to trigger the display of the content 402. Content related to a media channel, such as content 402, when displayed in media channel navigation user interface pane 304 may help a user ascertain what is happening on other media channels without leaving media channel navigation user interface pane 304 or a current presentation of media content.

Selection of a media channel included in a menu of media channels may additionally or alternatively include an "actuation-type" selection of the media channel. To illustrate, with selector object 310 positioned on a graphical object representing the media channel in the menu, a user may provide input (e.g., an actuation of an "OK" button of a remote control device) to access the media channel. With GUI screen view 400 displayed as shown in FIG. 4, for example, the user may provide input to select the "FOOD NETWORK" channel. Detection facility 102 may detect the user selection of the media channel. In response, management facility 104 may initiate an accessing of the media channel, such as by instructing media content access system 202 to tune to or otherwise access the media channel and to present video content 212 of a media program currently being distributed on the media channel in main video playback pane 302. Thus, a presentation of media content distributed on a currently-selected media channel may switch to a presentation of other media content distributed on another media channel in response to a selection of the other media channel in media channel navigation user interface pane 304. In this or a similar manner, a user may utilize media channel navigation user interface pane 304 to channel surf between various media channels.

In response to detection of the user selection of the media channel in media channel navigation user interface pane 304, management facility 104 may also perform one or more operations on media channel navigation user interface pane 304. For example, management facility 104 may automatically close media channel navigation user interface pane 304 by hiding or otherwise removing media channel navigation user interface pane 304 from view on display screen 208. Alternatively, management facility 104 may keep media channel navigation user interface pane 304 displayed on display screen 208 and may update the content of media channel navigation user interface pane 304 based on the selection of the media channel. For example, the media channels included in recency-based menu 312 may be updated to reflect the accessing of the selected media channel by media content access system 202, such as by the "FOOD NETWORK" channel being replaced by the previously accessed media channel in recency-based menu 312.

Media channel navigation user interface pane 304 may facilitate convenient and/or efficient channel surfing between recently-accessed media channels included in recency-based menu 312. This may improve an experience of a user with a media distribution service, especially in certain situations such as when the user wants to channel surf between three or four different media channels that are concurrently distributing three or four media programs (e.g., different sporting event programs) in order to stay up-to-date on each of the media programs (e.g., on the scores of the sporting events).

Returning to FIG. 3, a different one of media channel navigation tools 306 may be selected, such as by a default selection or a user selection. For example, the user may provide input to move selector object 310 from media channel navigation tool 306-2 to media channel navigation tool 306-3. Detection facility 102 may detect a selection of media channel navigation tool 306-3 in media channel navigation user interface pane 304. In response, management facility 104 may provide a menu of media channels that corresponds to media channel navigation tool 306-3 for concurrent display with the set of media channel navigation tools 306 in media channel navigation user interface pane 304.

Figure 5:
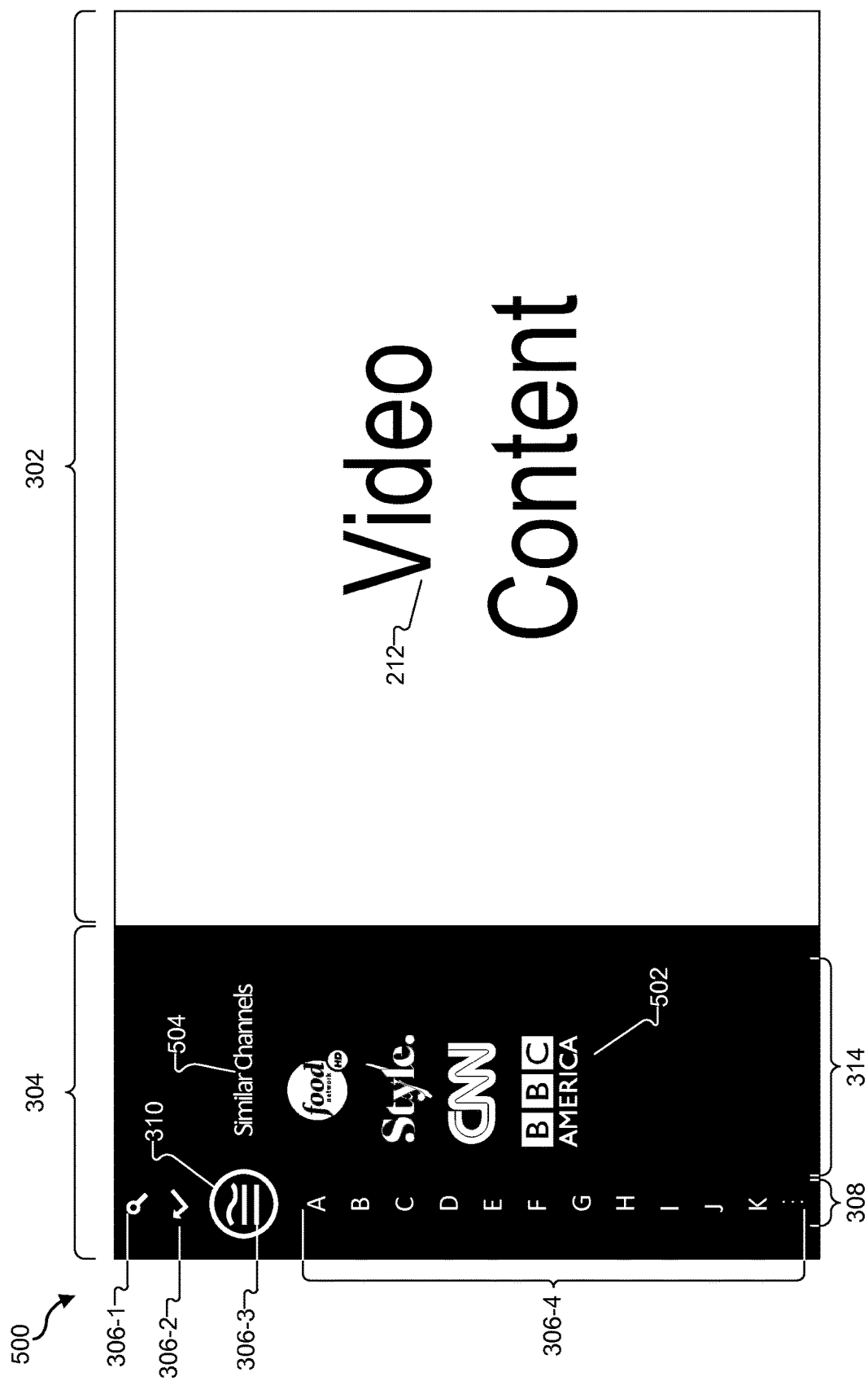

FIG. 5 illustrates a GUI screen view 500 that includes an exemplary similarity-based menu 502 of media channels that has been launched by management facility 104 for display in media channel navigation user interface pane 304 in response to a selection of media channel navigation tool 306-3. As shown, similarity-based menu 502 may include a set of media channels arranged in the second vertical column 314 in media channel navigation user interface pane 304. In the illustrated example, the set of media channels includes a "FOOD NETWORK" media channel, a "STYLE" media channel, a "CNN" media channel, and a "BBC AMERICA" media channel.

Management facility 104 may also provide, in media channel navigation user interface pane 304, a visual indication of a menu type associated with similarity-based menu 502. In FIG. 5, for example, media channel navigation user interface pane 304 includes a textual description 504 that is positioned as a header to similarity-based menu 502 and that indicates that the similarity-based menu 502 is a type of menu that includes media channels that are similar (e.g., thematically comparable) to the currently selected channel.

As part of providing similarity-based menu 502 for display in media channel navigation user interface pane 304, management facility 104 may select a set of media channels for inclusion in similarity-based menu 502 based on a set of predefined similarity-based channel selection factors. The set of factors may specify any suitable conditions to be satisfied in order for a media channel to be selected for inclusion in or excluded from similarity-based menu 502. Examples of similarity-based channel selection factors include, without limitation, an indication of a maximum number of media channels that may be included in similarity-based menu 502, an indication of a minimum channel similarity score to be satisfied for consideration of a media channel for inclusion in similarity-based menu 502, an indication of specific metadata fields for media channels and/or media programs to be used to identify similarities between media channels (e.g., media channel and/or media program genre fields), an instruction indicating how to determine a similarity score for a media channel with respect to another media channel, an instruction to exclude the media channel currently being accessed by media content access system 202 from similarity-based menu 502, an instruction to exclude a particular pre-selected media channel or type of media channel from similarity-based menu 502 (e.g., an instruction to exclude an adult-oriented media channel or a pay-per-view media channel), an instruction to consider only media channels with at least a threshold similarity to the currently accessed media channel for inclusion in similarity-based menu 502, an instruction to consider only media channels having a particular attribute for inclusion in similarity-based menu 502, an instruction to exclude media channels having or not having a particular attribute from being considered for inclusion in similarity-based menu 502, an instruction indicating how to prioritize media channels for selection and/or presentation in similarity-based menu 502, and any other factor that may be used by management facility 104 to select a set of media channels for inclusion in similarity-based menu 502.

Based on the set of predefined similarity-based channel selection factors, management facility 104 may select a set of media channels for inclusion in similarity-based menu 502. As an example, management facility 104 may access data representative of media channels that are included in a channel line-up and apply the set of predefined similarity-based channel selection factors to the data to select, from the channel line-up, a set of media channels for inclusion in similarity-based menu 502. Additionally or alternatively, management facility 104 may access data representative of media programs distributed (e.g., currently being distributed and/or about to be distributed based on a distribution schedule) on the media channels included in a channel line-up and apply the set of predefined similarity-based channel selection factors to the data to select, from the channel line-up, a set of media channels for inclusion in similarity-based menu 502.

To illustrate one example, if media content access system 202 is accessing a premium media channel (e.g., HBO) and presenting media content being carried on the premium media channel when similarity-based menu 502 is launched, similarity-based menu 502 may be populated by management facility 104 to include other premium media channels (e.g., HBO2, CINEMAX, etc.). To illustrate another example, if media content access system 202 is accessing a sports channel and presenting media content being carried on the sports channel when similarity-based menu 502 is launched, similarity-based menu 502 may be populated by management facility 104 to include other sports channels (e.g., ESPN, FOX SPORTS, etc.).

To illustrate another example, if media content access system 202 is accessing a media channel and presenting a media program being carried on the premium media channel when similarity-based menu 502 is launched, similarity-based menu 502 may be populated by management facility 104 to include one or more other media channels that are currently carrying media programs that are similar to the media program being carried by the accessed media channel. To this end, management facility 202 may determine and use one or more attributes of the media program (e.g., metadata and/or rich metadata values of the media program) being presented to search data representative of information about other media programs to identify one or more other media programs that have matching attributes and that are currently being distributed and/or are about to be distributed on one or more other available media channels. Management facility 202 may then select one or more of the media channels on which one or more of the identified media programs are being or will be distributed for inclusion, as a set of similar media channels, in similarity-based menu 502.

For instance, while a food-related segment of a news program is being presented on display screen 208, detection facility 102 may detect a selection of media channel navigation tool 306-3. In response, management facility 104 may identify a set of media channels on which similar content is currently being distributed. From this set of media channels, management facility 104 may select and populate similarity-based menu 502 with a set of media channels on which similar content is being distributed. For example, the media channels represented in similarity-based menu 502 may each be carrying a media program related to food, news, and/or other attributes of the food-related segment of the news program currently being presented on display screen 208. Accordingly, similarity-based menu 502 may inform a user of other channels that are currently carrying similar content, such as illustrated in FIG. 5. The user may provide any suitable input to select and access any of the media channels included in similarity-based menu 502, such as described herein.

A user may provide input to interact with similarity-based menu 502 in any of the ways described herein in relation to recency-based menu 312. For example, a user may provide input to select a media channel included in similarity-based menu 502. The selection may be a highlight-type selection and/or an actuation-type selection. Management facility 104 may perform one or more operations in response to a detection of the selection of the media channel, including any of the operations described herein in relation to selection of a media channel included in recency-based menu 312.

Detection facility 102 may detect a selection of media channel navigation tool 306-4 in media channel navigation user interface pane 304. In response, management facility 104 may provide a menu of media channels that corresponds to media channel navigation tool 306-4 for concurrent display with the set of media channel navigation tools 306 in media channel navigation user interface pane 304. For example, selector object 310 may be moved to an alphabetical character option included in media channel navigation tool 306-4. Detection facility 102 may detect this selection and, in response, management facility 104 may launch an alphabet-based menu of media channels in media channel navigation user interface pane 304.

Figure 6:
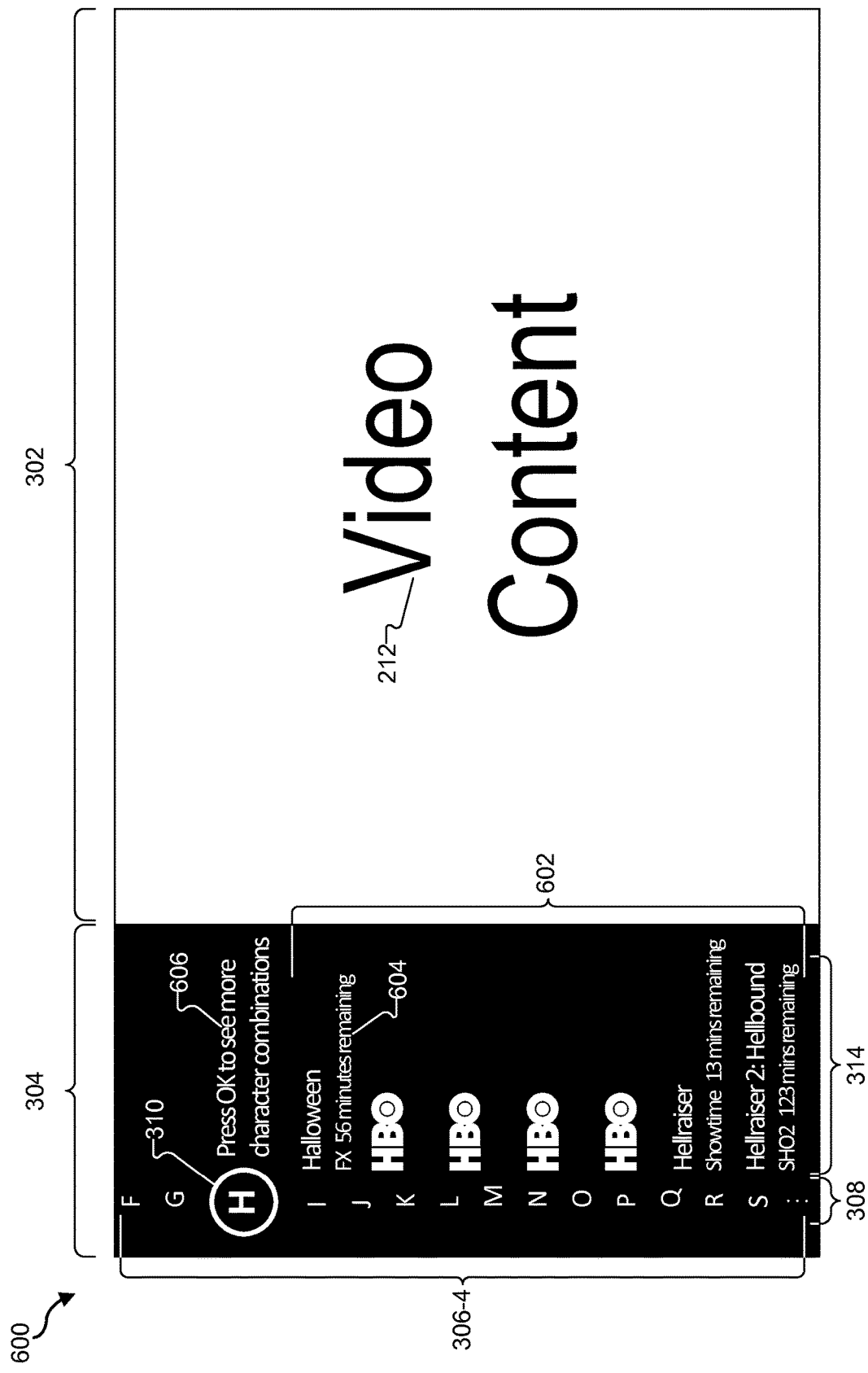

FIG. 6 illustrates a GUI screen view 600 that includes an exemplary alphabet-based menu 602 of media channels that has been launched by management facility 104 for display in media channel navigation user interface pane 304 in response to a selection of a selectable character "H" option included in media channel navigation tool 306-4. As shown, alphabet-based menu 602 may include a set of media channels arranged in the second vertical column 314 in media channel navigation user interface pane 304. In the illustrated example, the set of media channels includes media channels having names that start with the character "H" (e.g., four "HBO" media channels).

In certain examples, alphabet-based menu 602 may be a segment of an alphabetized list of media channels that are available to a user (e.g., media channels in a subscription package of the user). In such examples, management facility 104 may provide alphabet-based menu 602 by jumping to a position within the list of media channels based on the character option selected in media channel navigation tool 306-4. For example, in response to a detected selection of the character "H" option in media channel navigation tool 306-4, management facility 104 may jump to the first entry in the list that starts with the character "H" and use that entry as a starting point of a segment of the list that is provided as alphabet-based menu 602.

In certain examples, in addition to including media channels, alphabet-based menu 602 may include media programs that are currently being distributed on accessible media channels. In FIG. 6, for example, alphabet-based menu 602 includes both media channels and media programs currently being distributed on accessible media channels (e.g., "HBO" media channels and media programs titled "Halloween," "Hellraiser," and "Hellraiser 2") arranged alphabetically by name.

In examples in which alphabet-based menu 602 includes both media channels and media programs, management facility 104 may provide alphabet-based menu 602 by jumping to a position within an integrated list of accessible media channels and media programs currently being distributed on the accessible media channels based on the character option selected in media channel navigation tool 306-4. For example, in response to a detected selection of the character "H" option in media channel navigation tool 306-4, management facility 104 may jump to the first entry in the list that starts with the character "H" and use that entry as a starting point of a segment of the list that is provided as alphabet-based menu 602, such as is shown in FIG. 6.

Similar to alphabet-based menu 602 including either a set of media channels or a combination set of media channels and media programs currently being distributed on accessible media channels, other types of menus, such as recency-based menu 302 and similarity-based menu 502, may also include either a set of media channels or a combination set of media channels and media programs currently being distributed on accessible media channels. For example, while FIG. 5 illustrates one exemplary similarity-based menu 502 that includes only similar media channels, another similarity-based menu may include a combination of similar media channels and similar media programs currently being distribution on the media channels.

Management facility 104 may provide content related to media programs and/or media channels included in alphabet-based menu 602 for concurrent display with the alphabet-based menu 602 in media channel navigation user interface pane 304. In FIG. 6, for example, content 604 related to a media program titled "Halloween" is displayed adjacent to the "Halloween" menu entry in alphabet-based menu 602. As shown, content 604 may include an identifier of a media channel on which the media program is being distributed and the time remaining in the distribution of the media program. Content 604 may include any other information about and/or other displayable content that is related to the media program, such as the current score and/or statistics of a sporting event if the media program is a sporting event program. While FIG. 6 illustrates alphabet-based menu 602 to display content related media programs included in alphabet-based menu 602, in other examples alphabet-based menu 602 may additionally or alternatively display content related to media channels included in alphabet-based menu 602, such as described herein in relation to recency-based menu 302.

The selectable character options included in media channel navigation tool 306-4 may be dynamically adjusted in a manner that allows a user to select a combination of characters to jump to a more specific point in a list of alphabetized entries. To this end, management facility 104 may adjust the options included in media channel navigation tool 306-4 in response to detection of any suitable predefined user input. Examples of such input may include, without limitation, allowing selector object 310 to rest on a character option for at least a minimum threshold of time without the user providing user input or the user actuating an "OK" button when selector object 310 is positioned on a character option.

To illustrate, media channel navigation user interface pane 304 may include a textual description 606 indicating user input that may be provided by a user in order to launch additional character combinations in media channel navigation tool 306-4. In the illustrated example, the textual description 606 indicates that the user may actuate the "OK" button to see more character options.

Detection facility 102 may detect user input requesting more character options, and, in response, management facility 104 may provide additional, expanded character options in media channel navigation tool 306-4. The additional character options may include combinations of characters. For example, while selector object 310 is positioned on the character "H" option as shown in FIG. 6, a user may actuate the "OK" button. Detection facility 102 may detect this input, and management facility 104 may respond by expanding the options included in media channel navigation tool 306-4 to include sub-character combination options of the character "H" option.

Figure 7:
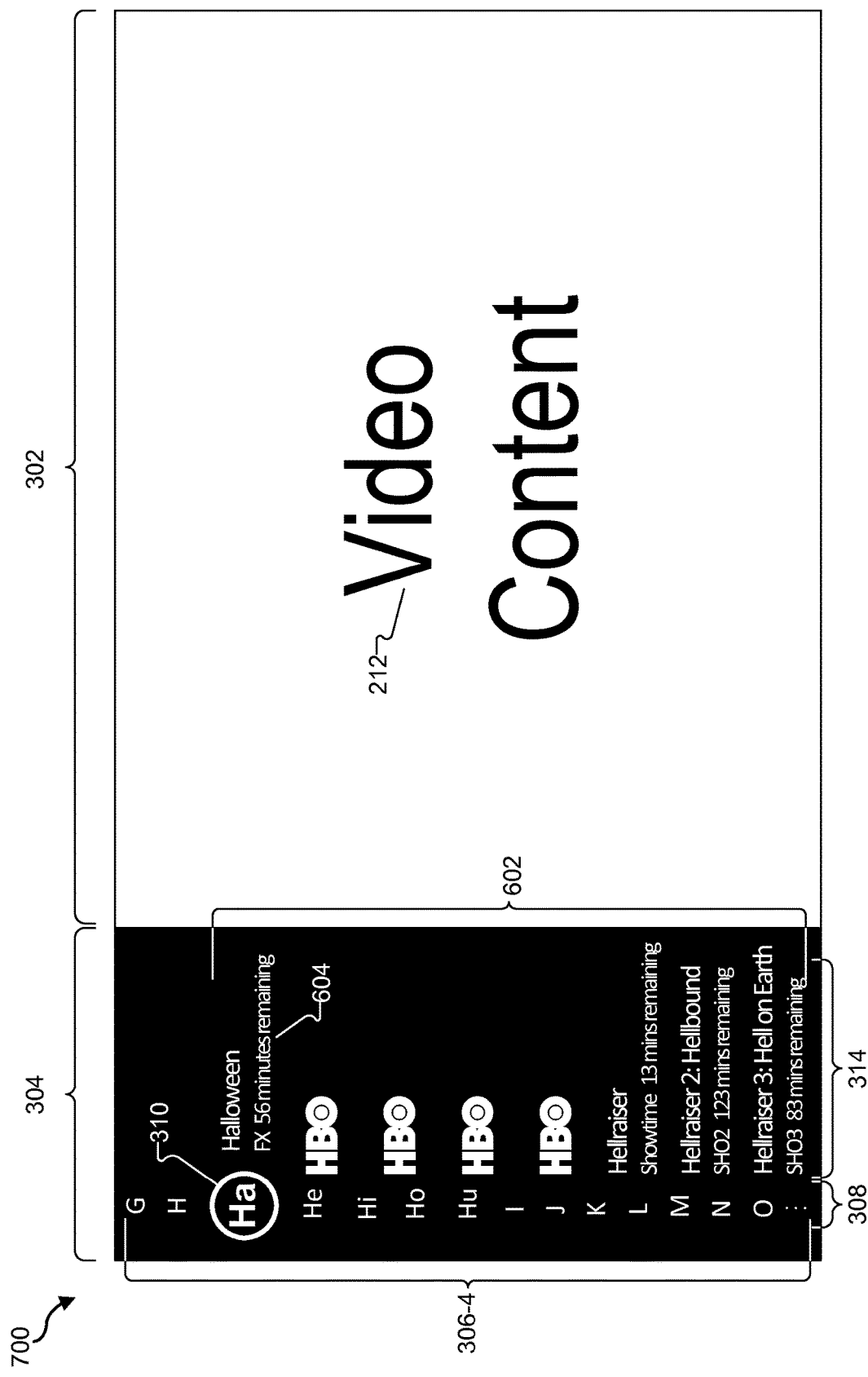

FIG. 7 illustrates an exemplary GUI screen view 700 in which the options included in media channel navigation tool 306-4 have been expanded to include sub-character combinations with the character "H." In the illustrated example, the sub-character combination options are "Ha," "He," "Hi," "Ho," and "Hu" displayed sequentially after the character "H" option.

In response to a selection of a sub-character combination option, management facility 104 may update alphabet-based menu 602 such as by jumping to a position in a list of entries based on the selected sub-character combination. For example, if selector object 310 is moved to select the "He" character combination option, management facility 104 may update alphabet-based menu 602 to include a list segment that begins with the first list entry that has a name starting with the characters "He" (e.g., a media program titled "Hellraiser"), making that entry the first entry in alphabet-based menu 602 displayed in media channel navigation user interface pane 604.

In certain examples, a sub-character combination may be expandable. Accordingly, management facility 104 may further expand the options included in media channel navigation tool 306-4. For example, in response to a detection of predefined user input, management facility 104 may expand the options to include sub-sub-character combinations of the "He" sub-character combination, such as "Hea" and "Hel," for instance.

A user may provide input to interact with alphabet-based menu 602 in any of the ways described herein in relation to recency-based menu 312. For example, a user may provide input to select a media channel or media program included in alphabet-based menu 602. The selection may be a highlight-type selection and/or an actuation-type selection. Management facility 104 may perform one or more operations in response to a detection of the selection of the media channel or media program, including any of the operations described herein in relation to selection of a media channel included in recency-based menu 312.

In certain examples, certain user interaction with media channel navigation tool 306-4 may trigger management facility 104 morphing the user interaction from being applied to the media channel navigation tool 306-4 to being applied to a search feature. For example, in response to user entry of a character combination having at least a minimum number of characters (e.g., a selection of a character combination that includes the minimum number of characters), management facility 104 may apply the selected character combination as input in a search field of the search feature. This may provide the user with a free-form tool to refine a search. In certain examples, morphing from application of the input to the media channel navigation tool 306-4 to application of the input to the search tool may transition from a filtering media channels and/or media programs that are currently being distributed on accessible media channels to more expansively searching an entire media catalogue of a media service.

Media channel navigation tool 306-4 have been described in the context of alphabetical character options. Additionally or alternatively, media channel navigation tools 306 may include a media channel navigation tool that operates similarly to media channel navigation tool but that uses numerical character options instead of alphabetical character options. A user may utilize such a media channel navigation tool to input numbers (e.g., a number combination), and, in response, management facility 104 may provide a number-based menu of media channels such as a list of matching numeric channel addresses.

In certain examples, one or more of the factors used by management facility 104 to select media channels and/or media programs for inclusion in a menu may be custom defined by a user of media content access system 202. Additionally or alternatively, other settings associated with operations of system 100 may be custom defined by the user. As an example, the user may define a setting that governs whether a menu will include only media channel entries or a combination of both media channel and media program entries. As another example, the user may define a setting that governs what content related to a media channel or media program will be displayed in a menu. As another example, the user may define a setting that governs which of media channel navigation tools 306 and/or related options will be included in media channel navigation user interface pane 304. System 100 may allow the user to define additional or alternative customizations as may suit a particular implementation.

Figure 8:
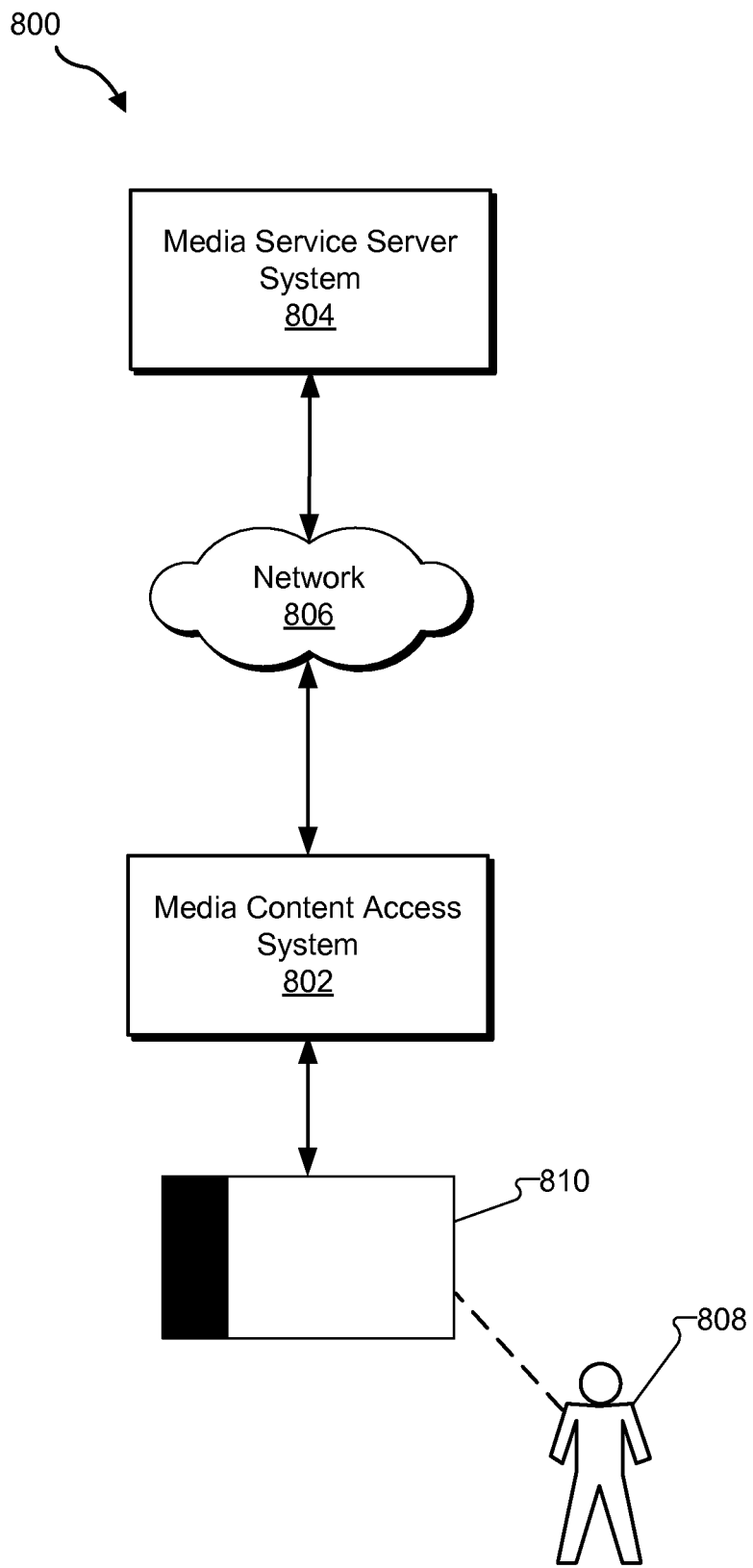
FIG. 8 illustrates an exemplary implementation of the system of FIG. 1 according to principles described herein.

FIG. 8 illustrates an exemplary implementation 800 of system 100. As shown in FIG. 8, implementation 800 may include a media content access system 802 communicatively coupled to a media service server system 804 ("server system 804") by way of a network 806. In implementation 800, system 100 or any of the components or operations of system 100 may be implemented entirely by media content access system 802, entirely by server system 804, or distributed across media content access system 802 and server system 804.

Server system 804 and media content access system 802 may communicate using any communication platforms and technologies suitable for transporting data and/or communication signals, including any of the communication technologies mentioned herein. Network 806 may include, but is not limited to, one or more wireless networks (Wi-Fi networks), wireless communication networks, mobile telephone networks (e.g., cellular telephone networks), mobile phone data networks, broadband networks, narrowband networks, the Internet, local area networks, wide area networks, live television transmission networks, media distribution networks, and any other networks capable of carrying media content, data, and/or communications signals between media content access system 802 and server system 804. Communications between media content access system 802 and server system 804 may be transported using any one of the above-listed networks, or any combination or sub-combination of the above-listed networks. Alternatively, media content access system 802 and server system 804 may communicate in another way such as by one or more direct connections between media content access system 802 and server system 804.

Server system 804 may include one or more server-side computing devices. Media content access system 802 may include a media content processing device (e.g., a set-top-box device, DVR device, television, gaming console, personal media player, media server, home media network gateway device, tablet computer, smartphone device, mobile device, etc.) capable of accessing a media channel and providing media content carried on the media channel for presentation to and experiencing by an end user 808 of the media service.

Server system 804 and/or media content access system 802 may perform one or more operations to provide a media service (e.g., a channel-based media distribution service) to end user 808. Media content access system 802 may provide a media service user interface 810 through which end user 808 may interact with the media service. Through media service user interface 810, end user 808 may access the media service, such as by accessing one or more features of the media service and/or media content accessible through the media service. In certain examples, media service user interface 810 may include a GUI provided by media content access system 802 for display on a display screen for use by end user 808. Screen views of the GUI, including any of the exemplary GUI screen views described herein, may be displayed on any suitable display screen accessible by end user 808, including on a display screen of a display device included in media content access system 802 or communicatively connected to media content access system 802.

Figure 9:
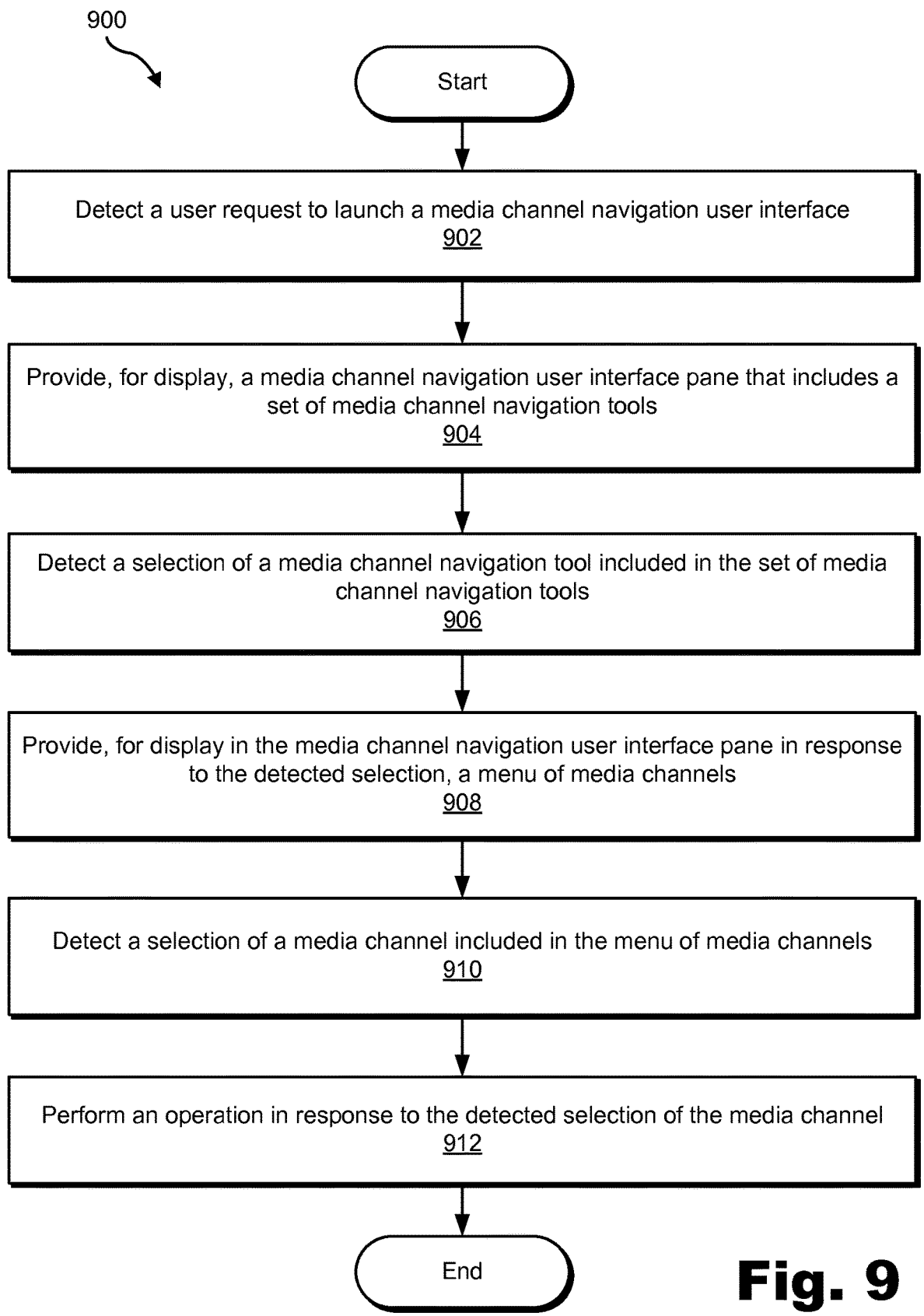
FIGS. 9-10 illustrate exemplary media channel navigation user interface methods according to principles described herein.
Figure 10:
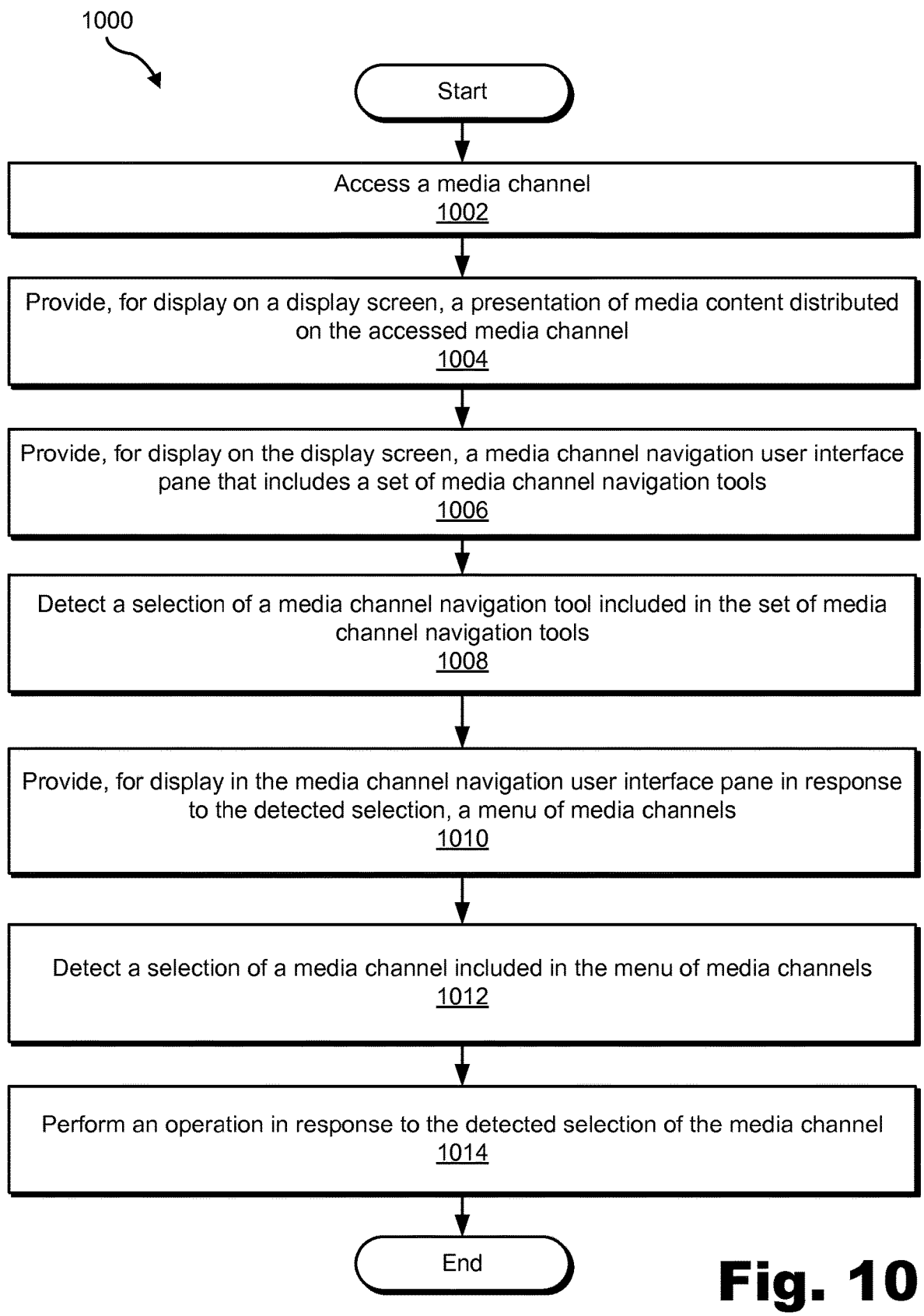

FIGS. 9-10 illustrate exemplary media channel navigation user interface methods 900-1000 according to principles described herein. While FIGS. 9-10 illustrate exemplary methods according to certain embodiments, other embodiments may omit, add to, reorder, combine, and/or modify any of the steps shown in FIGS. 9-10. In certain embodiments, one or more steps shown in FIGS. 9-10 may be performed by system 100 and/or one or more components or implementations of system 100, such as media content access system 202, media content access system 802, and/or media service server system 804.

Turning to FIG. 9, in step 902, a media channel navigation user interface system detects a user request to launch a media channel navigation user interface. The user request may be provided by a user and detected by the media channel navigation user interface system in any suitable way, such as while media content distributed on a media channel is being presented for display on a display screen.

In step 904, the media channel navigation user interface system provides, for display, a media channel navigation user interface pane that includes a set of media channel navigation tools. The media channel navigation user interface system may provide the media channel navigation user interface pane for display in any of the ways described herein, such as in response to the detected user request and for concurrent display with a presentation of media content on a display screen. The set of media channel navigation tools may include any of the exemplary media channel navigation tools described herein.

In step 906, the media channel navigation user interface system detects a selection of a media channel navigation tool included in the set of media channel navigation tools, such as described herein.

In step 908, the media channel navigation user interface system provides, for display in the media channel navigation user interface pane in response to the detected selection of the media channel navigation tool, a menu of media channels corresponding to the selected media channel navigation tool. The media channel navigation user interface system may provide the menu of media channels for display in any of the ways described herein, such as for concurrent display with the set of media channel navigation tools in the media channel navigation user interface pane. The menu of media channels may be any of the exemplary types of menus of media channels described herein.

In step 910, the media channel navigation user interface system detects a selection of a media channel included in the menu of media channels, such as described herein. The selection may include any of the exemplary types of selections described herein, such as a highlight-type or actuation-type selection.

In step 912, the media channel navigation user interface system performs an operation in response to the detected selection of the media channel. For example, the media channel navigation user interface system may provide content related to the media channel for display in the media channel navigation user interface pane or may direct a media content access system to access the selected media channel and present media content being distributed on the media channel, such as described herein.

Turning to FIG. 10, in step 1002, a media content access system accesses a media channel, such as by tuning to or otherwise selecting the media channel for access.

In step 1004, the media content access system provides, for display on a display screen, a presentation of media content distributed on the accessed media channel, such as described herein.

In step 1006, the media content access system provides, for display on the display screen, a media channel navigation user interface pane that includes a set of media channel navigation tools. The media content access system may provide the media channel navigation user interface pane for display in any of the ways described herein, such as for concurrent display with a presentation of media content on the display screen. The set of media channel navigation tools may include any of the exemplary media channel navigation tools described herein.

In step 1008, the media content access system detects a selection of a media channel navigation tool included in the set of media channel navigation tools, such as described herein.

In step 1010, the media content access system provides, for display in the media channel navigation user interface pane in response to the detected selection of the media channel navigation tool, a menu of media channels corresponding to the selected media channel navigation tool. The media content access system may provide the menu of media channels for display in any of the ways described herein, such as for concurrent display with the set of media channel navigation tools in the media channel navigation user interface pane. The menu of media channels may be any of the exemplary types of menus of media channels described herein.

In step 1012, the media content access system detects a selection of a media channel included in the menu of media channels, such as described herein. The selection may include any of the exemplary types of selections described herein, such as a highlight-type or actuation-type selection.

In step 1014, the media content access system performs an operation in response to the detected selection of the media channel. For example, the media content access system may provide content related to the media channel for display in the media channel navigation user interface pane, or may access the selected media channel and present media content being distributed on the media channel, such as described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a Compact Disc Read-Only Memory ("CD-ROM") disc, Digital Video Disc ("DVD"), any other optical medium, a random access memory ("RAM") device, a programmable read-only memory ("PROM") device, an erasable programmable read only memory ("EPROM") device, an Electrically Erasable Programmable Read-Only Memory ("EEPROM") device, a Flash EEPROM device, any other memory chip or cartridge, or any other tangible medium from which a computer can read.

Figure 11:
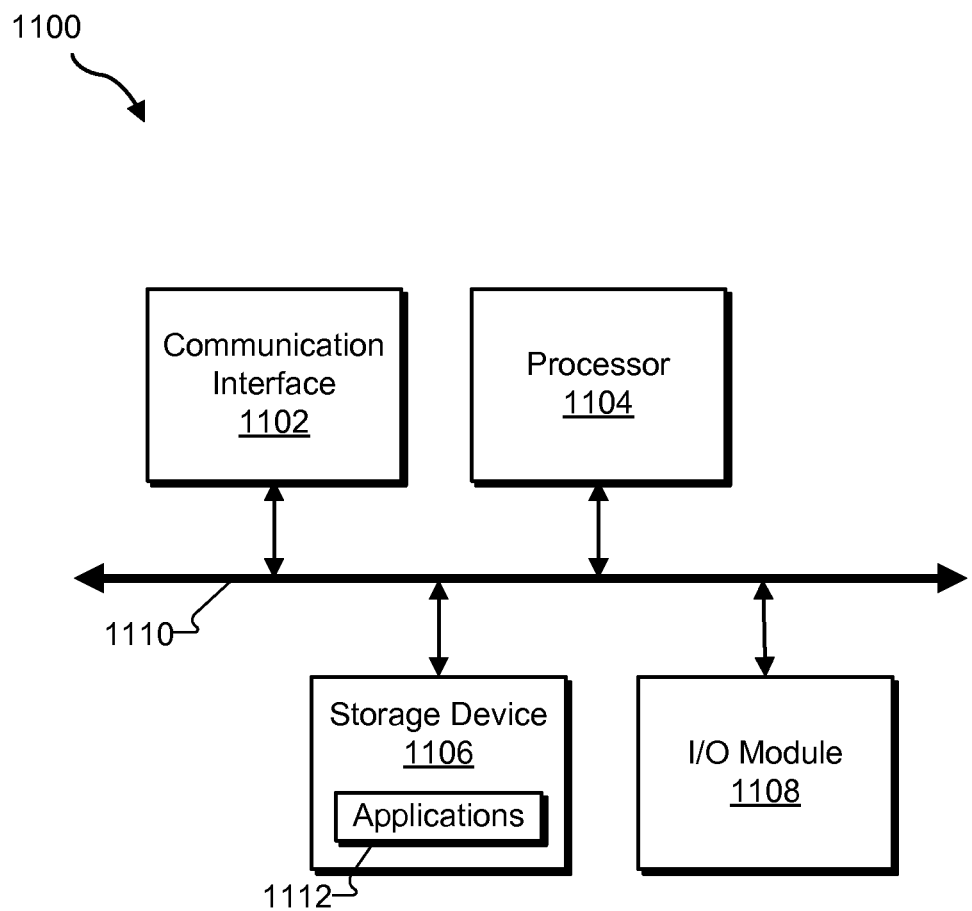
FIG. 11 illustrates an exemplary computing device according to principles described herein.

FIG. 11 illustrates an exemplary computing device 1100 that may be configured to perform one or more of the processes described herein. As shown in FIG. 11, computing device 1100 may include a communication interface 1102, a processor 1104, a storage device 1106, and an input/output ("I/O") module 1108 communicatively connected via a communication infrastructure 1110, which generally represents any form of communication structure that transfers data between components inside a computer, or between computers, and may include, but is not limited to, an internal system bus, an external expansion bus, network infrastructure, or other suitable communications structure. While an exemplary computing device 1100 is shown in FIG. 11, the components illustrated in FIG. 11 are not intended to be limiting. Additional or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, an audio/video connection, and any other suitable interface.

Processor 1104 generally represents any type or form of processing unit capable of processing data or interpreting, executing, and/or directing execution of one or more of the instructions, processes, and/or operations described herein. Processor 1104 may direct execution of operations in accordance with one or more applications 1112 or other computer-executable instructions such as may be stored in storage device 1106 or another computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, RAM, DRAM, other non-volatile and/or volatile data storage units, or a combination or sub-combination thereof. Electronic data, including data described herein, may be temporarily and/or permanently stored in storage device 1106. For example, data representative of one or more executable applications 1112 configured to direct processor 1104 to perform any of the operations described herein may be stored within storage device 1106. In some examples, data may be arranged in one or more databases residing within storage device 1106.

I/O module 1108 may be configured to receive user input and provide user output and may include any hardware, firmware, software, or combination thereof supportive of input and output capabilities. For example, I/O module 1108 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1108 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1100. For example, one or more applications 1112 residing within storage device 1106 may be configured to direct processor 1104 to perform one or more processes or functions associated with detection facility 102 and/or management facility 104. Likewise, storage facility 106 may be implemented by or within storage device 1106.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    detecting, by a media channel navigation user interface system while media content distributed on a media channel is being presented for display on a display screen, a user request to launch a media channel navigation user interface;
    selecting, by the media channel navigation user interface system based on a set of predefined similarity-based channel selection factors, a plurality of other media channels each characterized by sharing an attribute of the media channel;
    selecting, by the media channel navigation user interface system, a media program characterized by sharing an attribute of the media content that is distributed on the media channel; and
    providing, by the media channel navigation user interface system in response to the detected user request and for concurrent display with the presentation of the media content on the display screen, a media channel navigation user interface pane comprising a set of media channel navigation tools that include
        a first media channel navigation tool selectable by a user to launch a similarity-based menu of media options in the media channel navigation user interface pane, the media options in the similarity-based menu of media options including a similarity-based combination set of media channels and media programs currently being distributed, the similarity-based combination set of media channels and media programs comprising the selected plurality of other media channels and the selected media program, and
        a second media channel navigation tool selectable by the user to launch a recency-based menu of media options in the media channel navigation user interface pane, the media options in the recency-based menu of media options including a recency-based combination set of media channels and media programs selected based on recency of access prior to a launch of the recency-based menu.

2. The method of claim 1, wherein the set of media channel navigation tools further includes a third media channel navigation tool selectable by the user to launch a third type of menu of media options in the media channel navigation user interface pane, the third type of menu of media options different from the recency-based menu of media options and the similarity-based menu of media options.

3. The method of claim 2, wherein
    the third type of menu of media options comprises an alphabet-based menu of media options.

4. The method of claim 1, further comprising:
    detecting, by the media channel navigation user interface system, a selection of the first media channel navigation tool in the media channel navigation user interface pane; and
    providing, by the media channel navigation user interface system in response to the detected selection of the first media channel navigation tool, the similarity-based menu of media options for concurrent display with the set of media channel navigation tools in the media channel navigation user interface pane.

5. The method of claim 1, further comprising:
    detecting, by the media channel navigation user interface system, a selection of the second media channel navigation tool in the media channel navigation user interface pane; and
    providing, by the media channel navigation user interface system in response to the detected selection of the second media channel navigation tool, the recency-based menu of media options for concurrent display with the set of media channel navigation tools in the media channel navigation user interface pane.

6. The method of claim 4, further comprising:
   detecting, by the media channel navigation user interface system, a selection of a media channel included in the similarity-based menu of media options; and
   providing, by the media channel navigation user interface system in response to the detected selection of the media channel, content related to the media channel for display within the similarity-based menu of media options in the media channel navigation user interface pane.

7. The method of claim 1, embodied as computer-executable instructions on at least one non-transitory computer-readable medium.

8. A method comprising:
   accessing, by a media content access system, a media channel;
   providing, by the media content access system for display on a display screen, a presentation of media content distributed on the accessed media channel; and
   providing, by the media content access system for concurrent display with the presentation of the media content on the display screen, a media channel navigation user interface pane that includes a menu of media channel navigation tools comprising
      a recent-channel navigation tool selectable by a user to launch, in the media channel navigation user interface pane, a recency-based menu including a recency-based combination set of media channels and media programs currently being distributed, the recency-based combination set of media channels and media programs selected for inclusion in the recency-based menu based on recency of access prior to the launch of the recency-based menu, and
      a similar-channel navigation tool selectable by the user to launch, in the media channel navigation user interface pane, a similarity-based menu including a similarity-based combination set of media channels and media programs currently being distributed, the similarity-based combination set of media channels and media programs comprising one or more media channels and one or more media programs, the one or more media channels each selected for inclusion in the similarity-based menu based on at least one attribute shared with the accessed media channel and based on a set of predefined similarity-based channel selection factors, and the one or more media programs each selected for inclusion in the similarity-based menu based on at least one attribute shared with media content being distributed on the accessed media channel.

9. The method of claim 8, wherein the set of media channel navigation tools further include an alphabet-based channel navigation tool selectable by the user to launch, in the media channel navigation user interface pane, an alphabet-based menu of one or more media channels selected for inclusion in the alphabet-based menu based on alphabetical similarity to the accessed media channel.

10. The method of claim 8, further comprising:
    detecting, by the media channel navigation user interface system, a selection of the recent-channel navigation tool in the media channel navigation user interface pane; and
    providing, by the media channel navigation user interface system in response to the detected selection of the recent-channel navigation tool, the recency-based menu including the recency-based combination set of media channels and media programs for concurrent display with the set of media channel navigation tools in the media channel navigation user interface pane.

11. The method of claim 10, further comprising:
    detecting, by the media channel navigation user interface system, a selection of a media channel included in the recency-based menu; and
    providing, by the media channel navigation user interface system in response to the detected selection of the media channel and for display in the recency-based menu, informational content about a media program currently being distributed on the selected media channel.

12. The method of claim 8, embodied as computer-executable instructions on at least one non-transitory computer-readable medium.

13. A system comprising:
    at least one processor; and
    a non-transitory computer-readable medium storing instructions that, when executed by the at least one processor, causes the at least one processor to:
       detect, while media content distributed on a media channel is being presented for display on a display screen, a user request to launch a media channel navigation user interface;
       select, based on a set of predefined similarity-based channel selection factors, a plurality of other media channels each characterized by sharing an attribute of the media channel;
       select a media program characterized by sharing an attribute of the media content that is distributed on the media channel; and
       provide, in response to the detected user request and for concurrent display with the presentation of the media content on the display screen, a media channel navigation user interface pane comprising a set of media channel navigation tools that include
          a first media channel navigation tool selectable by a user to launch a similarity-based menu of media options in the media channel navigation user interface pane, the media options in the similarity-based menu of media options including a similarity-based combination set of media channels and media programs currently being distributed, the similarity-based combination set of media channels and media programs comprising the selected plurality of other media channels and the selected media program, and
          a second media channel navigation tool selectable by the user to launch a recency-based menu of media options in the media channel navigation user interface pane, the media options in the recency-based menu of media options including a recency-based combination set of media channels and media programs selected based on recency of access prior to a launch of the recency-based menu.

14. The system of claim 13, wherein the set of media channel navigation tools further includes a third media channel navigation tool selectable by the user to launch a third type of menu of media options in the media channel navigation user interface pane, the third type of menu of media options different from the recency-based menu of media options and the similarity-based menu of media options.

15. The system of claim 14, wherein the third type of menu of media options comprises an alphabet-based menu of media options.

16. The system of claim 13, wherein the instructions, when executed by the at least one processor, further cause the at least one processor to:
- detect, by the media channel navigation user interface system, a selection of the first media channel navigation tool in the media channel navigation user interface pane; and
- provide, by the media channel navigation user interface system in response to the detected selection of the first media channel navigation tool, the similarity-based menu of media options for concurrent display with the set of media channel navigation tools in the media channel navigation user interface pane.

17. The method of claim 3, wherein the media options in the alphabet-based menu of media options include a combination set of media channels and media programs comprising an additional media channel selected for inclusion in the alphabet-based menu of media options based on alphabetical similarity to the media channel, and an additional media program selected for inclusion in the alphabet-based menu of media options based on alphabetical similarity to the media channel.

18. The system of claim 15, wherein
the media options in the alphabet-based menu of media options include a combination set of media channels and media programs comprising
- an additional media channel selected for inclusion in the alphabet-based menu of media options based on alphabetical similarity to the media channel, and
- an additional media program selected for inclusion in the alphabet-based menu of media options based on alphabetical similarity to the media channel.

19. The method of claim 5, wherein
the providing of the recency-based menu of media options for display comprises selecting one or more media channels, from a history of accessed media channels, for inclusion in the recency-based menu of media options based on a set of predefined recency-based channel selection factors.

20. The system of claim 13, wherein the instructions, when executed by the at least one processor, further cause the at least one processor to:
- detect, by the media channel navigation user interface system, a selection of the second media channel navigation tool in the media channel navigation user interface pane; and
- provide, by the media channel navigation user interface system in response to the detected selection of the second media channel navigation tool, the recency-based menu of media options for concurrent display with the set of media channel navigation tools in the media channel navigation user interface pane.

* * * * *